(12) United States Patent
Kvesić et al.

(10) Patent No.: US 10,772,468 B2
(45) Date of Patent: Sep. 15, 2020

(54) ELECTRIC MOTOR-OPERATED FOOD PROCESSOR

(71) Applicant: Vorwerk & Co. Interholding GmbH, Wuppertal (DE)

(72) Inventors: Mirko Kvesić, Juelich (DE); Janik Nachbarschulte, Essen (DE); Thomas Erner, Wuppertal (DE); Amin Nezami, Remscheid (DE); Mathias Varnhorst, Wuppertal (DE); Daniel Katagarov, Muenster (DE); Philipp Bettenhausen, Dortmund (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 218 days.

(21) Appl. No.: 16/008,206

(22) Filed: Jun. 14, 2018

(65) Prior Publication Data
US 2018/0360272 A1    Dec. 20, 2018

(30) Foreign Application Priority Data

Jun. 16, 2017    (DE) .................. 10 2017 113 284

(51) Int. Cl.
| | |
|---|---|
| *A47J 43/07* | (2006.01) |
| *C12H 6/02* | (2019.01) |
| *B01D 5/00* | (2006.01) |
| *B01D 3/00* | (2006.01) |
| *B02C 9/02* | (2006.01) |

(Continued)

(52) U.S. Cl.
CPC ........... *A47J 43/0722* (2013.01); *A47J 43/07* (2013.01); *B01D 3/003* (2013.01); *B01D 5/006* (2013.01); *B01D 5/0042* (2013.01); *B02C 9/02* (2013.01); *C12C 7/01* (2013.01); *C12C 13/10* (2013.01); *C12H 6/02* (2019.02); *B01D 5/0081* (2013.01)

(58) Field of Classification Search
CPC ........ A47J 43/0722; A47J 43/07; A47J 44/02; A47J 43/0716; B01D 3/003; B01D 5/006; B01D 5/0042; B01D 5/0081; B01D 3/001; C12H 6/02; C12C 13/10; C12C 7/01; B02C 9/02
See application file for complete search history.

(56) References Cited

U.S. PATENT DOCUMENTS

| | | | | |
|---|---|---|---|---|
| 2005/0223906 A1* | 10/2005 | Xu | .......... | A47J 27/004 99/348 |
| 2014/0001027 A1* | 1/2014 | Balass | .......... | C11B 9/027 203/1 |

FOREIGN PATENT DOCUMENTS

| | | | | |
|---|---|---|---|---|
| EP | 0095797 A1 * | 12/1983 | ............ | A47J 36/38 |
| WO | WO-2013131731 A1 * | 9/2013 | ............ | A47J 43/046 |

OTHER PUBLICATIONS

Machine Translation of WO2013131731A1, Roessler, Sep. 2013 (Year: 2013).*

* cited by examiner

*Primary Examiner* — Ryan J. Walters
(74) *Attorney, Agent, or Firm* — Collard & Roe, P.C.

(57) ABSTRACT

An electric motor-operated food processor has a base unit having an electric motor and a preparation vessel that can be arranged on the base unit. A heater and agitator are allocated to the preparation vessel. The food processor can have a distillation apparatus that can be connected with the preparation vessel. The distillation apparatus has a steam receptacle, a condenser and a liquid dispenser. The preparation (Continued)

vessel and steam receptacle are connected in terms of flow when the preparation vessel and distillation apparatus are in a connected state.

10 Claims, 3 Drawing Sheets

(51) Int. Cl.
*C12C 7/01* (2006.01)
*C12C 13/10* (2006.01)

ELECTRIC MOTOR-OPERATED FOOD PROCESSOR

CROSS REFERENCE TO RELATED APPLICATIONS

Applicant claims priority under 35 U.S.C. § 119 of German Application No. 10 2017 113 284.8 filed Jun. 16, 2017, the disclosure of which is incorporated by reference.

BACKGROUND OF THE INVENTION

1. Field of the Invention

The invention relates to an electric motor-operated food processor with a base unit having an electric motor and a preparation vessel that can be arranged on the base unit, wherein a heater and agitator are allocated to the preparation vessel.

In addition, the invention relates to a distillation apparatus with a steam receptacle, a condenser and a liquid dispenser.

The invention likewise relates to a method for operating a food processor, which has a base unit having an electric motor and a preparation vessel that can be arranged on the base unit, wherein a heater and agitator are allocated to the preparation vessel, wherein a liquid contained in the preparation vessel is heated to above its boiling point.

2. The Prior Art

Electric motor-operated food processors and standalone distillation apparatuses are known in the art.

For example, the electric motor-operated food processors have a preparation vessel, into which an agitator extends through a vessel floor. For example, the agitator can be designed as a blade set with a plurality of blades, so as to comminute and/or stir foodstuffs located in the preparation vessel. It is further known to heat foodstuffs located in the reparation vessel, to include in particular liquids, wherein heating can take place concurrently with agitator operation.

Also known in the art are distillation apparatuses designed as standalone devices, which are used to make alcohol, in particular potable alcohol. Two distillation processes are usually performed to make potable alcohol. An alcohol base is produced in a first distillation process. The alcohol base is aromatized in the second distillation process. A plurality of manufacturing steps must be performed overall, in part outside of the distillation apparatus and in part with the distillation apparatus.

A mash is usually first produced and fermented. To this end, grain is comminuted and, after adding water, gelatinized by heating and stirring. In addition, an enzyme or malt is added. The mash produced in this way must usually ferment for a few days before it can be further processed.

For the distillation process, the completely fermented mash is placed in a corresponding vessel of the distillation apparatus, and there brought to a boil, for example using a Bunsen burner. The steam that arises during the boiling process is condensed, wherein condensate forerunning and tailings are separated out, since, when a boiling temperature of approx. 78 degrees Celsius is dropped below, the latter contains too high a percentage of methanol, whose degradation products can have serious consequences for humans, ranging from headaches and nerve damage to life-threatening consequences. The safely drinkable percentage of the alcohol base produced in this way is subsequently diluted with water and enriched with flavorings. This once again takes place inside of the distillation apparatus, where the alcohol-water mixture is again evaporated, condensed and collected again, while adding the flavorings. The forerunning and tailings are here again separated out.

The disadvantage to known distillation apparatuses is that they can only be used for the distillation process, but not for producing the mash. For this reason, several separate devices are required, which complicates handling during alcohol production on the one hand, and requires a large storage space on the other. Because temperature regulation is required, the mash is also very expensive to manufacture. In addition, the temperature for the distillation process must be set and monitored, to prevent burning on the one hand, and keep the percentage of methanol in the alcohol low on the other. Therefore, it is recommended that alcohol be manufactured only by especially knowledgeable users.

SUMMARY OF THE INVENTION

Proceeding from the aforementioned prior art, the object of the invention is to make the manufacture of alcohol accessible to a larger group of users, and eliminate the disadvantages described above for this purpose.

In order to achieve the aforementioned object, the invention initially proposes an electric motor-operated food processor with a base unit having an electric motor and a preparation vessel that can be arranged on the base unit, wherein a heater and agitator are allocated to the preparation vessel, wherein the food processor further has a distillation apparatus that can be connected with the preparation vessel, and has a steam receptacle, a condenser and a liquid dispenser, wherein the preparation vessel and steam receptacle are connected in terms of flow when the preparation vessel and distillation apparatus are in a connected state.

According to the invention, the proposed electric motor-operated food processor now combines conventional functions, such as stirring and heating, with the functions of a distillation apparatus. The distillation apparatus forms an accessory for the food processor, in particular an attachment for the preparation vessel. It is recommended that the preparation vessel and distillation apparatus be designed to be connected to each other, for example by means of connecting areas that correspond in terms of shape, and if necessary have a mechanism for reciprocal latching or locking. In particular, a locking mechanism can be used for this purpose, which usually is also used to lock the preparation vessel with a cover. Alternatively, it can also be provided that the distillation apparatus not be placed on the preparation vessel, but connected with the base unit of the food processor in some other way, wherein it is ensured that the steam rising from the preparation vessel can get into the steam receptacle of the distillation apparatus. It is basically possible that the distillation apparatus be arranged outside of the food processor, provided it is ensured that the preparation vessel is connected in terms of flow with the steam receptacle of the distillation apparatus. The inventive combination of the electric motor-operated food processor with a distillation apparatus makes it possible to perform a plurality of steps to be implemented for manufacturing alcohol using the combination produced in this way. His relates in particular to the procedural steps for producing mash and executing the burning process. Specifically, the food processor enhanced with the distillation attachment makes it possible to comminute grain, receive added water, heat, stir, receive enzymes or malt, as well as ferment inside of the preparation vessel. If the preparation vessel of the food processor is required for other jobs during the fermenting process, it can of course also be provided that the user use a separate vessel either for the fermenting process or some other operation of the food processor, in particular an additional preparation vessel of the food processor. For a burning process, the combination of food processor and distillation apparatus can execute the procedural steps of boiling the mash, condensing the steam and collecting the condensate, and if necessary ensures that the forerunning and tailings of the condensate are separated out. If need be, the steam can be filtered. The food processor enhanced by the distillation apparatus is further also designed for flavoring the alcohol, wherein the preparation vessel is enhanced with a strainer insert, with which flavorings, so-called "botanicals", can be introduced into the alcohol base contained in the preparation vessel. The flavorings can likewise be comminuted again by means of the agitator of the food processor. For flavoring purposes, the alcohol base is diluted with water, and likewise again brought to a boil with the heater, wherein the steam is condensed as described above and collected as a liquid. A forerunning or tailing can here be monitored or separated here as well.

As a whole, enhancing a conventional electric motor-operated food processor with a distillation apparatus as the accessory makes it possible to execute a controlled, monitored and user-friendly manufacturing process. Additional devices of the food processor can here likewise be useful, for example an integrated scale for measuring the added ingredients while manufacturing the mash, or also the quantity of water added prior to flavoring. Furthermore, a temperature measuring device allocated to the heater is also useful, for example to determine the current temperature of the mash or alcohol base present in the preparation vessel. The process reliability attained by an evaluator and controller makes the manufacture of alcohol user-independent, thereby making the manufacture of alcohol accessible to a larger circle of users.

The steam receptacle can have a temperature sensor for measuring the steam temperature. In this embodiment, the steam receptacle itself has a temperature sensor, so that the current temperature of the steam inside of the steam receptacle can be measured. This enables a particularly precise temperature measurement, so as to prevent an excessive formation of methanol. The temperature measuring device usually provided inside of the electric motor-driven food processor is usually allocated to the heater. This temperature measuring device is frequently integrated into a floor area of the preparation vessel, as is the case with the heater. However, the temperature measured there might not be identical to the current temperature of the foodstuff contained in the preparation vessel, and above all not to the steam inside of the steam receptacle. For this reason, the temperature sensor arranged inside of the steam receptacle, whether operated alone or additionally, provides a greater certainty about the actual temperature during evaporation. This makes it possible to precisely determine when the boiling temperature of methanol hazardous to health (65 degrees Celsius) or harmless methanol (78 degrees Celsius) has been reached. The temperature sensor is especially preferably located in a flow path of the steam, wherein the distance between the preparation vessel and measuring location should not be unnecessarily large, or not be encumbered by cooling walls and/or obstacles. The steam can preferably reach the temperature sensor without any preceding turbulence or flow deflection. The temperature sensor is preferably an electric or electronic component, which transmits an electric signal to a controller and evaluator of the food processor. To this end, there is a corresponding electric line between the base unit of the food processor and distillation apparatus. The temperature sensor is advantageously a heat resistor (NTC) or cold resistor (PTC). Furthermore, thermocouples or the like are also possible. It can also be provided that several temperature sensors be arranged inside of the steam receptacle. The measured values recorded by the plurality of temperature sensors can be averaged or processed into a temperature value in some other way.

It is proposed that the steam receptacle be a flow channel that provides a flow connection between the preparation vessel and condenser. The steam receptacle is preferably comprised of a flow channel, which conveys the steam from the preparation vessel to the condenser. This flow channel preferably extends along a straight longitudinal area, in a direction corresponding to the natural direction of steam propagation, i.e., in a vertical direction. The flow channel can preferably be formed in a housing of the distillation apparatus, wherein the latter preferably has an inlet opening through which the steam can flow into the steam receptacle in a connecting area to the preparation vessel of the food processor. The distillation apparatus or preparation vessel advantageously has corresponding connecting areas for establishing the flow connection, wherein the steam receptacle has the inlet opening formed in the connecting area. The distillation apparatus especially preferably has a base plate that can be attached onto the preparation vessel, and provides an inlet opening in the flow channel.

The steam receptacle can taper like a funnel in the direction of steam flow. In the area of an inlet opening of the steam receptacle, the funnel shape can also have the largest possible inlet cross section, so that the largest possible quantity of steam can flow into the steam receptacle without already condensing in another area of the preparation vessel and flow back into the liquid. The steam receptacle tapers in the direction of the condenser, as a result of which the flow rate inside of the steam receptacle is increased on the one hand, and an advantageous compression for the subsequent condensation process can be achieved on the other.

The condenser of the distillation apparatus can have a cooling device. In particular, the cooling device can be a heat exchanger or Peltier element. The cooling device can further have a cooling container, a ventilator or some other means, which are suitable for reducing the steam temperature and bring about condensation. In this conjunction, possible heat exchangers can also be countercurrent heat exchangers, cooling circuits or others. It is recommended in particular that a heat exchanger be designed as a cooling coil, thereby making the largest possible interaction path available for condensing the steam.

The distillation apparatus can have a receiving area allocated to the liquid dispenser for arranging a collecting vessel. In an especially simple case, the liquid dispenser is an end area of a flow channel, which adjoins the condenser in the direction of condensate flow. An outlet opening of the liquid dispenser is preferably oriented in the direction of gravitational force, so that the condensate can flow out of the condenser and through the liquid dispenser especially easily guided by gravity. A collecting vessel, for example a glass, a bottle or some other vessel, can then be arranged underneath the liquid dispenser within the receiving area. Depending on the shape of the housing of the distillation apparatus, the receiving area can preferably be arranged above the preparation vessel of the food processor and below the liquid dispenser. A base plate of the distillation apparatus that is placed on the preparation vessel especially preferably provides the receiving area.

A device for automatically emptying and/or removing the collecting vessel can further be allocated to the receiving area. In an especially preferred embodiment, this device makes it possible to automatically separate the forerunning and tailings of the condensate that arises during condensation. The device preferably has a mechanism that removes the collecting vessel from the receiving area and empties it, or releases an opening in the collecting vessel, so that the forerunning and tailings can flow out of the collecting vessel or the like. This measure ensures that the forerunning or tailings are actually removed from the collecting vessel, and do not remain in the distillate, which otherwise could lead to serious damage to the health.

The food processor can have an evaluator and controller, which is set up to compare a measured temperature with a defined temperature range and, if the measured temperature deviates from the defined temperature range, transmit information about the deviation to a user of the food processor and/or initiate an evacuation of a collecting vessel. The evaluator and controller can be used to monitor nearly the entire process of alcohol production, starting with the production of mash and ending with the execution of the distillation process. In order to ensure that the user of the food processor does in fact remove the condensate forerunning and tailings from the collecting vessel, the evaluator and controller is set up to determine which portion of the condensate has to be separated out, and which portion can be used as potable alcohol. In a simple case, the user of the food processor is left to empty the collecting vessel, wherein the user is informed about the necessity of evacuation. In an automated embodiment, the evaluator and controller controls a device for emptying and/or removing the collecting vessel. Both aforementioned embodiments serve to provide the user with a product that is safe and harmless.

Apart from the food processor described above, the invention further proposes a distillation apparatus with a steam receptacle, a condenser and a liquid dispenser, wherein the distillation apparatus has a connecting area for establishing a flow connection with a preparation vessel of a food processor, and wherein the steam receptacle has an inlet opening formed in the connecting area. In particular, the connecting area of the distillation apparatus can have a base plate exhibiting the inlet opening. The distillation apparatus serves as an accessory for a food processor proposed above, wherein the distillation apparatus has a connecting area for connection with a preparation vessel of the food processor. The steam receptacle of the distillation apparatus is here preferably arranged and designed in such a way that its inlet opening extends into the connecting area to the preparation vessel, and that steam exiting the preparation vessel can get into the steam receptacle as directly as possible. The distillation apparatus especially preferably has a base plate or a housing floor, in which the inlet opening is formed. The base plate can be placed on an edge of the preparation vessel, so that the inlet opening formed in the base plate is arranged directly above the preparation vessel, and the steam rises upward into the distillation apparatus.

The distillation apparatus can further have all features that were previously also described in relation to a food processor having a distillation apparatus. In particular, this relates to a temperature sensor of the steam receptacle, a configuration of the steam receptacle as a flow channel, a funnel-shaped configuration of the receptacle, various types of condensers, a receiving area for arranging a collecting vessel, as well as a device for automatically emptying and/or removing the collecting vessel.

Finally, the invention further proposes a method for operating a food processor with a base unit having an electric motor and a preparation vessel that can be arranged on the base unit, wherein a heater and agitator are allocated to the preparation vessel, and wherein a liquid contained in the preparation vessel is heated to above its boiling point. According to the invention, a distillation apparatus is connected with the preparation vessel in such a way that steam flowing out of the preparation vessel flows into the distillation apparatus, wherein the steam is collected in a steam receptacle, then condensed in a condenser, and arising condensate is dispensed by a liquid dispenser.

BRIEF DESCRIPTION OF THE DRAWINGS

The invention will be described in greater detail below based on exemplary embodiments. As shown in the drawings.

DETAILED DESCRIPTION OF THE EMBODIMENTS

Figure 1:
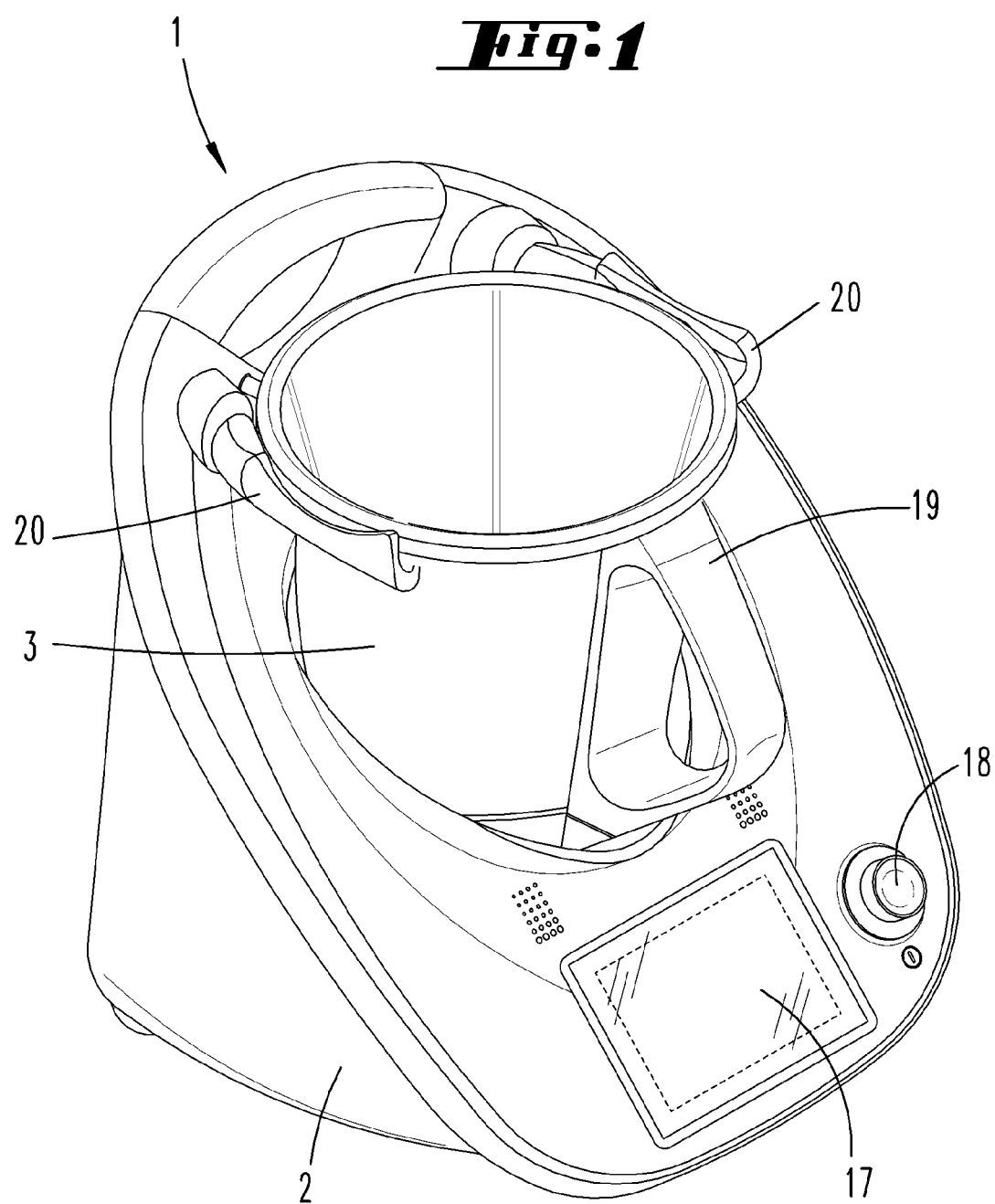
FIG. 1 is a food processor according to the prior art.

FIG. 1 initially shows an electric motor-operated food processor 1 of the kind known from the prior art. The food processor 1 is designed as a combined cooker-mixer. The food processor 1 has a base unit 2 for receiving a preparation vessel 3. Located inside of the preparation vessel 3 is an agitator 4, which can be connected with a driving attachment arranged in the base unit 2. The base unit 2 further has a display 17 to display a selection menu as well as to display information for the user of the food processor 1. The food processor 1 further has a switch 18, with which an electric motor of the food processor 1 can be activated on the one hand, and a selection of specific preparation steps can be confirmed on the other, wherein the preparation steps were possibly selected beforehand via the display 17. The base unit 2 further has two locking elements 20, which among other things can serve to lock the preparation vessel 3 with a cover (not shown). In the depicted arrangement, the locking elements 20 can rotate around a horizontal axis. The preparation vessel 3 further has a grip 19, which the user can grab to connect the preparation vessel 3 with the base unit 2 or detach the latter from each other. Also situated in a floor area of the preparation vessel 3 is a heater (not shown), which is used to heat the preparation vessel 3. For example, the heater can be a thick layer heater. In addition, the preparation vessel 3 can have a temperature sensor, which measures a current temperature on the preparation vessel 3.

Figure 2:
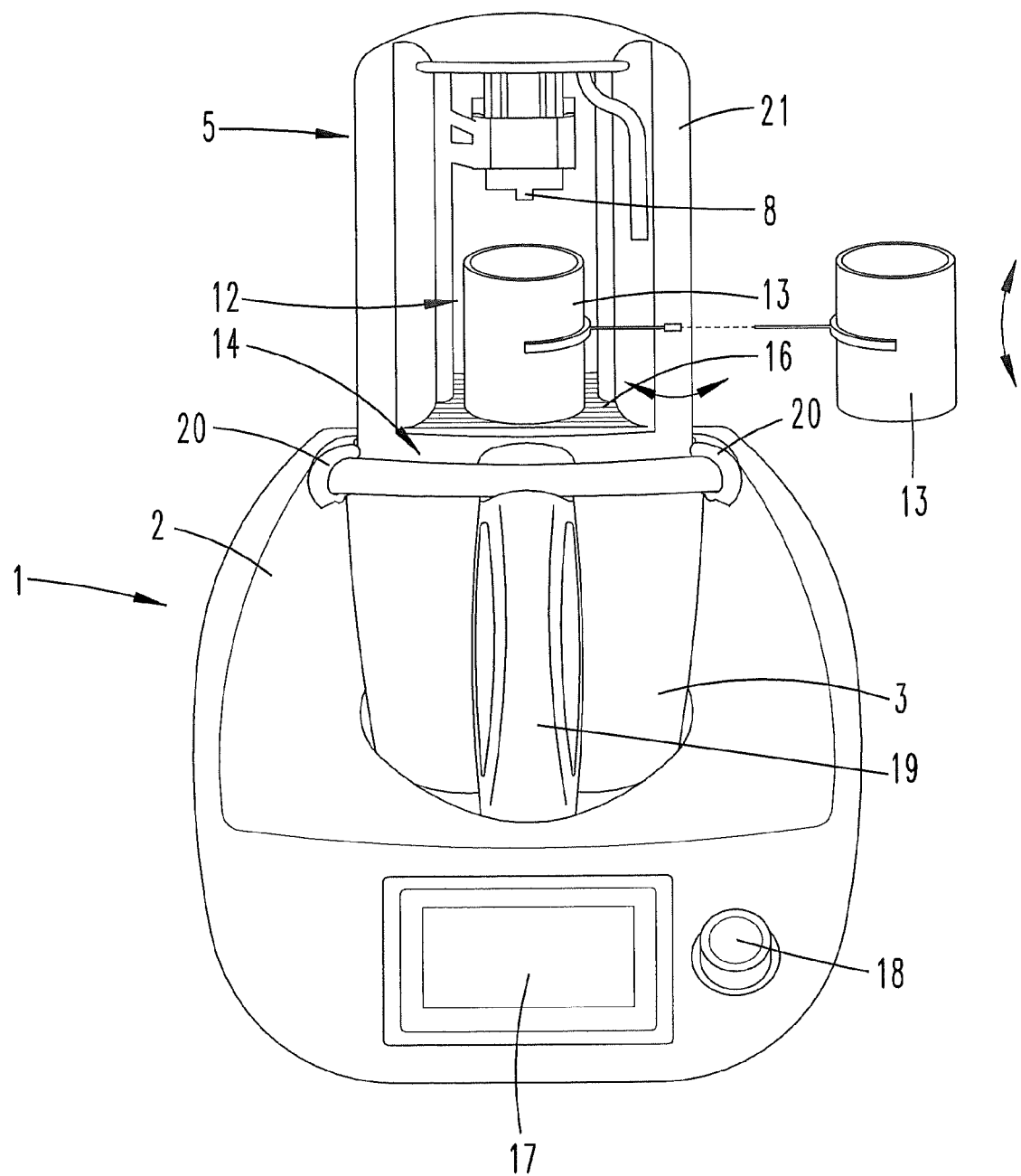
FIG. 2 is a front view of a food processor with a distillation apparatus placed on a preparation vessel.

FIG. 2 shows the food processor 1 according to FIG. 1 with a distillation apparatus 5 placed on the preparation vessel 3. The distillation apparatus 5 has a connecting area 14, here specifically a base plate 16 of the distillation apparatus 5, which can be rigidly connected with the preparation vessel 3 by means of the locking elements 20. Specifically, the distillation apparatus 5 has a housing 21, inside of which are located a steam receptacle 6 and a condenser 7. The steam receptacle 6 and condenser 7 are not visible in the illustration on FIG. 2. The distillation apparatus 5 further has a liquid dispenser 8, which in a receiving area 12 for a collecting vessel 13 protrudes out of the housing 21 of the distillation apparatus 5. The liquid dispenser 8 is here an end area of a liquid line. The collecting vessel 13 is here a glass, which can be removed from the receiving area 12 and placed in the receiving area 12, specifically in such a way that the collecting vessel 13 stands under the liquid dispenser 8 and dispensed liquid can flow into the collecting vessel 13.

Figure 3:
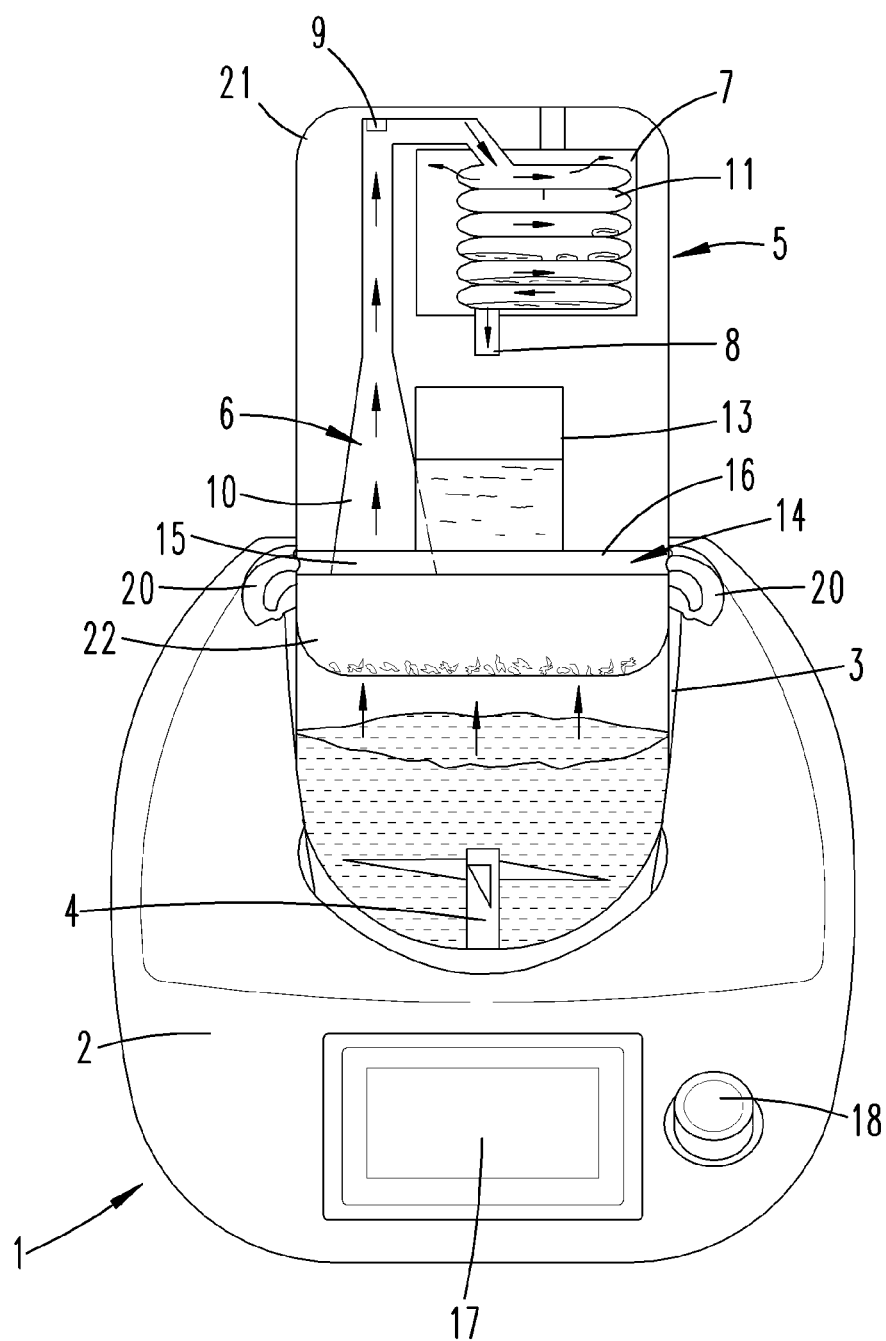
FIG. 3 is a functional sketch of a food processor having a distillation apparatus in a partially broken up view.

FIG. 3 presents a schematic sketch of a food processor 1 with a distillation apparatus 5, which schematically illustrates the functional principle of a food processor 1 configured as on FIG. 2. Located inside of the distillation apparatus 5, i.e., inside of the housing 21, is the steam receptacle 6, which is here designed as a funnel-shaped flow channel 10. The flow channel 10 tapers in a direction viewed from the bottom up on the sheet plane. This corresponds to the direction from an inlet opening 15 of the steam receptacle 6 up to the condenser 7. The inlet opening 15 of the distillation apparatus 5 is an opening cut out of the base plate 16. Steam can get into the steam receptacle 6 through this inlet opening 15. The steam receptacle 6 has a temperature sensor 9, which here is designed as a semiconductor sensor. The measured values of the temperature sensor 9 are read out by means of an evaluator and controller of the food processor 1 (not shown). The condenser 7 adjoins the steam receptacle 6. It has a cooling device 11 that provides a helical flow path, which is guided through a cooled housing. For example, cooling can take place with a Peltier element. In addition, FIG. 3 shows a strainer 22 arranged inside of the preparation vessel 3 of the food processor 1, which can be used to hold flavorings while flavoring an alcohol base.

In order to manufacture potable alcohol with the food processor 1, a mash consisting of grain, fruit or the like is first made. To this end, for example, grain is poured into the preparation vessel 3 and comminuted, i.e., shredded, with a blade set secured to the agitator 4. Water is then added, and the mixture is stirred with the agitator while being heated. After this so-called gelatinization, an enzyme or malt is added. The mixture must then ferment, which usually takes several days.

After the fermentation process, the preparation vessel 3 containing the mash is connected with the base unit 2 of the food processor 1 and the distillation apparatus 5 if needed, so that the inlet opening 15 of the distillation apparatus 5 lies over the preparation vessel 3. The mash is then brought to a boil with the heating device of the food processor 1, so that steam gets into the steam receptacle 6 of the distillation apparatus 5 through the inlet opening 15, flows past the temperature sensor 9 and finally condenses inside the condenser 7. The condensate gets into the collecting vessel 13 arranged in the receiving area 12 via the liquid dispenser 8. During the distillation process, the temperature sensor 9 measures the temperature of the steam inside of the steam receptacle 6. The measured values are relayed to the evaluator and controller of the food processor 1, and there compared with a defined temperature range, which indicates the temperature range between the boiling temperature of methanol and the boiling temperature of ethanol. Methanol boils at 65 degrees Celsius, while ethanol only boils starting at 78 degrees Celsius. If distillation takes place slowly, a high methanol-content fraction is first formed during a forerunning of the distillation process, which must be disposed of. As soon as the boiling point of ethanol has been reached, the ethanol percentage rises, and the resultant condensate forms the potable portion of the alcohol. As soon as the temperature again drops below the boiling point of the ethanol, the relative methanol percentage rises once again, so that this fraction should also be disposed of again. This is the so-called tailings.

If the evaluator and controller determines that the temperature of the steam is lower than the boiling temperature of the ethanol, i.e., lower than 78 degrees Celsius, information is put on the display 17 of the base unit 2, with a prompt to empty the collecting vessel 13. Alternatively, it could also be provided that an automatically controlled mechanism remove the collecting vessel 13 from the receiving area 12 and empty, or that the liquid be dispensed into a drain proceeding directly from the liquid dispenser 8. An additional line might be required for this purpose.

During the distillation process, the steam travels from the steam receptacle 6 into the condenser 7, and is there cooled down to a point where the steam condenses into a liquid. The liquid is then dispensed into the collecting vessel 13. After the distillation process has ended, including once the forerunning and tailings have been disposed of, a potable alcohol base is obtained. The latter is usually flavored by once again using the distillation apparatus 5. The alcohol base is first diluted until the alcohol content measures 40% by volume, for example. The alcohol base is mixed with water for this purpose. The strainer 22 is introduced into the preparation vessel 3 of the food processor 1, and contains flavorings, such as herbs. The distillation apparatus 5 is then connected with the preparation vessel 3 again, and the mixture is brought to a boil. The arising steam once again passes through the steam receptacle 6, the condenser 7 and the liquid dispenser 8. The condensate is collected inside of a collecting vessel 13, wherein the forerunning and tailings are here as well separated once again. A potable alcohol with a preset alcohol content is then present in the collecting vessel 13.

The method can further involve using a scale of the food processor 1 for weighing grain, water and the like. In addition, a stirring function of the agitator 4 is also advantageously continued during distillation, for example to prevent burn-off.

REFERENCE LIST

1 Food processor
2 Base unit
3 Preparation vessel
4 Agitator
5 Distillation apparatus
6 Steam receptacle
7 Condenser
8 Liquid dispenser
9 Temperature sensor
10 Flow channel
11 Cooling device
12 Receiving area
13 Collecting vessel
14 Connecting area
15 Inlet opening
16 Base plate
17 Display
18 Switch
19 Grip
20 Locking element
21 Housing
22 Strainer

What is claimed is:

1. An electric motor-operated food processor comprising:
a base unit having an electric motor,
a preparation vessel configured to be arranged on the base unit, a heater and agitator allocated to the preparation vessel, and a distillation apparatus configured to be connected with the preparation vessel, the distillation apparatus comprising:
a steam receptacle,
a condenser and
a liquid dispenser,
wherein the preparation vessel and steam receptacle are connected via a flow connection when the preparation vessel and distillation apparatus are in a connected state,
wherein the distillation apparatus has a receiving area allocated to the liquid dispenser for arranging a collecting vessel; and
wherein the liquid dispenser protrudes in the receiving area out of the housing in the distillation apparatus.

2. The food processor according to claim 1, wherein the steam receptacle has a temperature sensor for measuring the steam temperature.

3. The food processor according to claim 1, wherein the steam receptacle is a flow channel that provides the flow connection between the preparation vessel and condenser.

4. The food processor according to claim 1, wherein the steam receptacle tapers like a funnel in the direction of steam flow.

5. The food processor according to claim 1, wherein the condenser has a cooling device.

6. The food processor according to claim 5, wherein the cooling device is a heat exchanger or Peltier element.

7. The food processor according to claim 1, further comprising a device configured for automatically emptying and/or removing the collecting vessel, the device being allocated to the receiving area.

8. The food processor according to claim 1, further comprising an evaluator and controller, which is set up to compare a measured temperature with a defined temperature range and, if the measured temperature deviates from the defined temperature range, transmit information about the deviation to a user of the food processor and/or initiate an evacuation of the collecting vessel.

9. A distillation apparatus comprising:
a steam receptacle,
a condenser, and
a liquid dispenser,
wherein the distillation apparatus has a connecting area for establishing a flow connection with a preparation vessel of a food processor, the connecting area having a base plate with an inlet opening to the steam receptacle,
wherein the distillation apparatus has a receiving area allocated to the liquid dispenser for arranging a collecting vessel; and
wherein the receiving area is located on a side of the base plate facing the preparation vessel, so that the collecting vessel can be placed in the receiving area on the base plate.

10. A method for operating a food processor according to claim 1, comprising:
connecting a distillation apparatus to the preparation vessel,
heating a liquid contained in the preparation vessel to above its boiling point so that steam flowing out of the preparation vessel flows into the distillation apparatus,
collecting the steam in a steam receptacle,
condensing the collected steam in a condenser, and
dispensing the resulting condensate by a liquid dispenser.

* * * * *